Patented Dec. 3, 1946

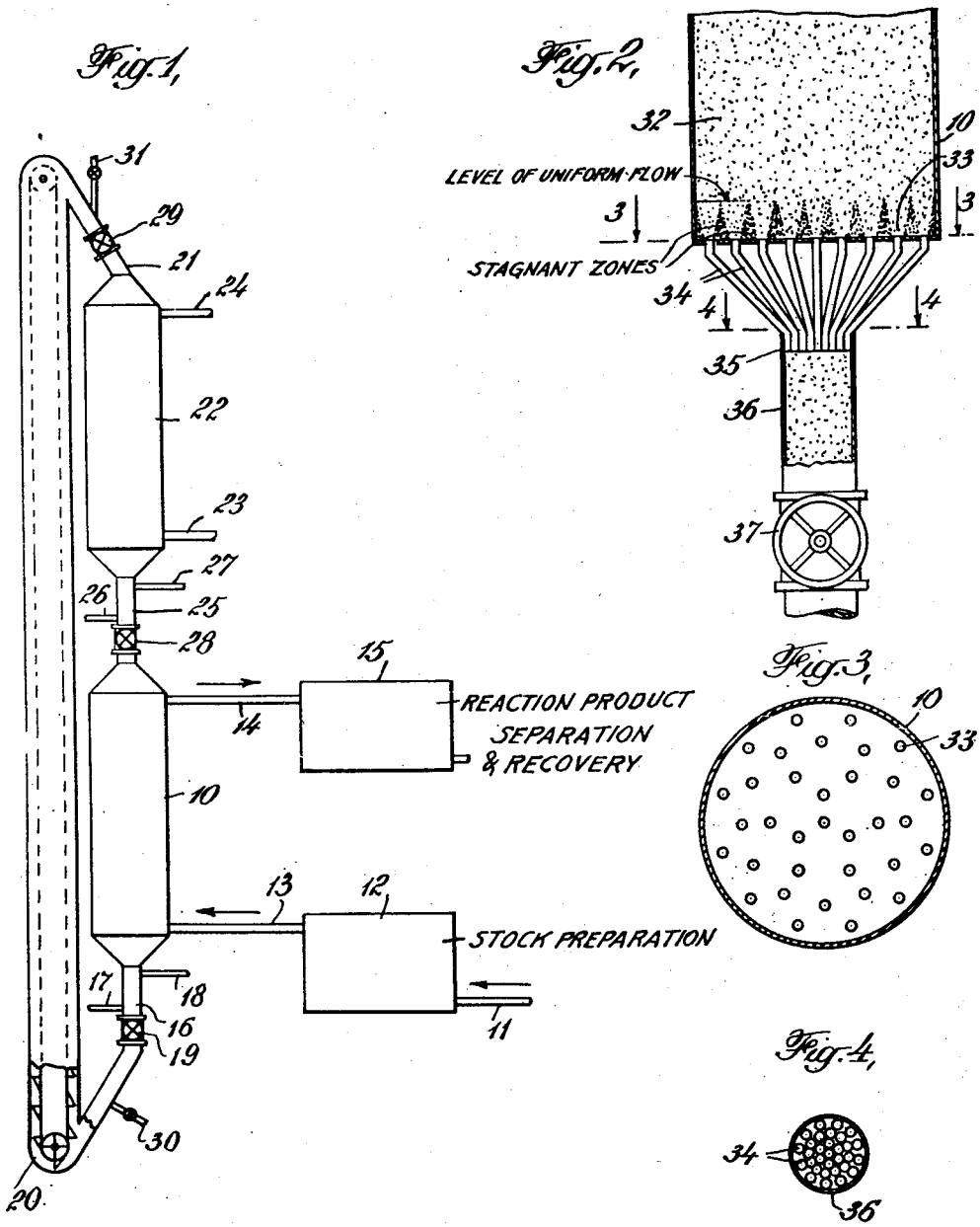

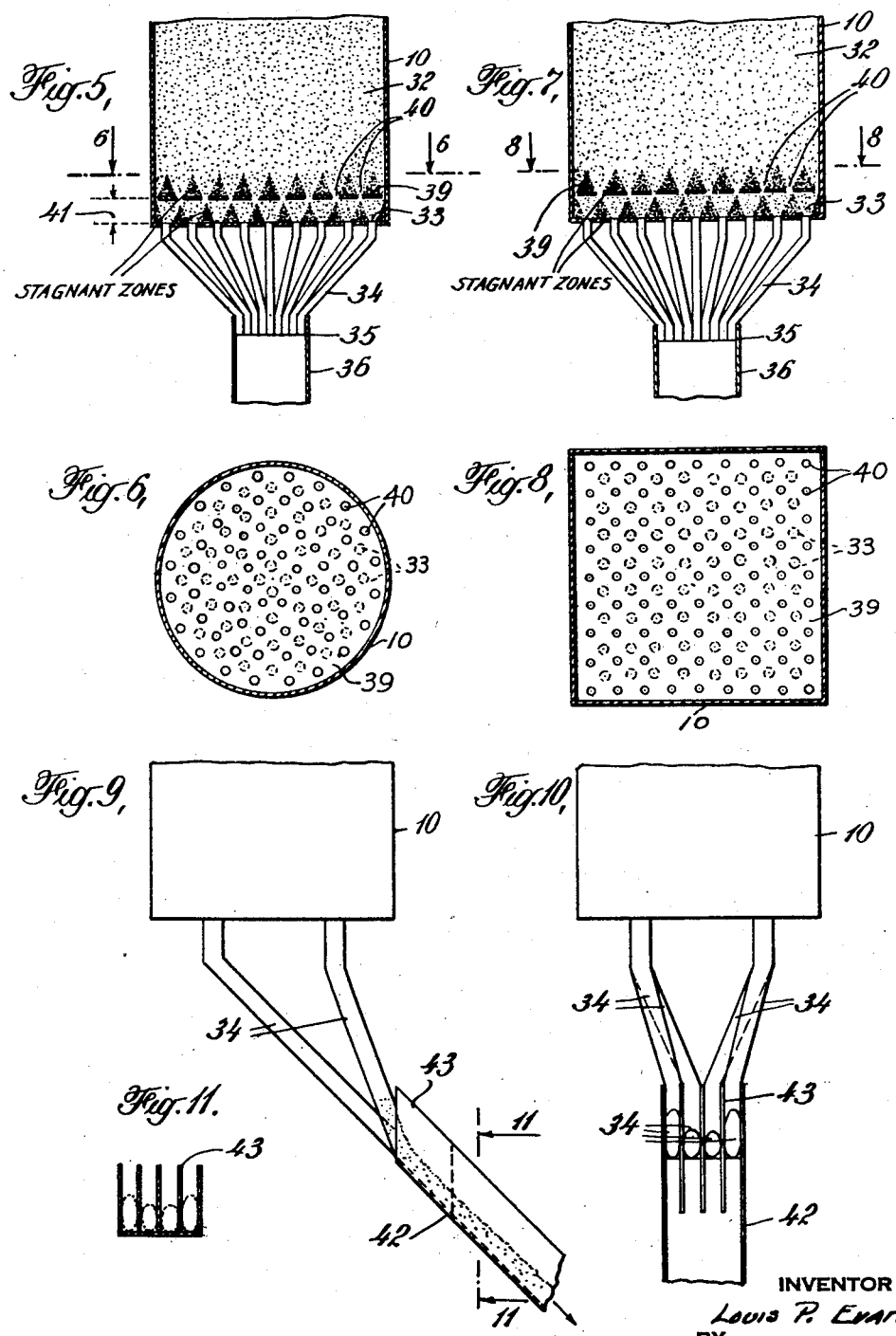

2,412,135

UNITED STATES PATENT OFFICE 2,412,135

METHOD AND APPARATUS FOR HYDROCARBON CONVERSION

Louis P. Evans, Woodbury, N. J., assignor to Socony-Vacuum Oil Company, Incorporated, a corporation of New York Application January 28, 1943, Serial No. 473,859

17 Claims. (Cl. 196—52)

This invention has to do with methods and apparatus for a conversion of hydrocarbon materials and is particularly concerned with processes such as those wherein a hydrocarbon to be converted is contacted in vapor form with a solid contact mass material capable of effecting or of influencing the desired conversion.

As is well known at this time, hydrocarbon materials may be cracked by being passed at appropriate temperatures in contact with a particle form solid contact mass of catalytic material such as a clay, either natural or synthetic, various associations of alumina and silica either natural or synthetic, alumina, silica or any of a number of similar materials possessing adsorbent properties. Other reactions such as hydrogenation, dehydrogenation, alkylation, isomerization, and various other reactions may be similarly carried out, and in many of these cases the solid adsorbent material will contain or act as a carrier for an added material such as a metallic oxide capable of effecting the desired reaction. Typical of all of these reactions is the reaction of cracking a high boiling point hydrocarbon material to material of the nature of gasoline. While the cracking conversion of hydrocarbons will be utilized herein in describing the process, it is to be understood that the invention is not limited thereto.

Many operations of this general class have been carried out in equipment wherein the solid contact material is deposited as a fixed bed, alternately subjected to reaction and to regeneration. More recently processes have been proposed wherein a particle-form solid contact mass material catalytic in nature to the desired reaction, as described above, is moved in the form of a flowing stream through a reaction zone wherein the desired reaction is accomplished and then through a regeneration zone wherein residual products of the reaction which have been deposited upon the contact mass material, usually in the form of a combustible carbonaceous substance, broadly designated by the term coke, are removed, usually by combustion, to regenerate the contact mass material, after which the contact mass material is returned to the reaction zone. This invention is specifically directed to process and apparatus for the conduct of such processes wherein flowing particle form solid contact mass material is used.

This invention has for its principal object the provision of method and apparatus wherein a complete and uniform utilization of all the portions of the flowing stream of contact mass material may be attained in both the reaction zone and the regeneration zone.

It has for a principal object the provision of withdrawal means to be utilized in such zones whereby uniform withdrawal across the entire area of the flowing stream of contact mass material may be effected to provide uniform passage of such material through all portions of the flowing stream.

The successful operation of processes involving continuous flow of particle form solid material through reaction vessels as in the cracking and regeneration steps of the continuous conversion process outlined above, requires that the flowing of the particle form solid material be uniform throughout the reaction zones of these vessels. When granular material is discharged from the base of a vessel through an outlet of relatively small size as compared with the vessel, the velocity of flow will vary widely across a horizontal cross-section of the vessel and will be greatest directly above the outlet. This difference in velocity decreases at higher levels in the vessel, but equal velocity and even flow is never obtained in a large vessel if its cross sectional area is much greater than that of the outlet. Previous methods have involved the use of grates or multiple ports individually regulated in an attempt to achieve even flow of particle form material in large vessels. Grates present mechanical difficulties and are particularly undesirable on pressure vessels as they do not in themselves provide means whereby escape of reaction vapors from the vessel with solid material may be avoided and by their nature they render the provision of such means a difficult and complicated problem. The individual and concurrent control of multiple ports is too complicated for practical manual control and automatic regulators prove expensive and troublesome under high temperature operating conditions.

This invention avoids these difficulties by providing a simple and efficient method whereby the combined problems of uniform flow, uniform discharge and prevention of reactant escape are accomplished through the application of relatively simple principles of operation and items of equipment.

The invention may be understood by reference to the drawings attached to this specification. In these drawings Figure 1 is a highly diagrammatic showing of the entire setup used for accomplishing the conversion. Figure 2 is a vertical cross-section of one form of the apparatus, and Figures 3 and 4 are cross-sections at various levels therein. Figure 5 is a vertical section of a modified form of apparatus, as is Figure 7. Figures 6 and 8 are horizontal sections associated respectively with Figures 5 and 7. Figures 9, 10 and 11 show a collateral use of the principle explained in other figures.

Turning now to Figure 1. This figure shows in highly diagrammatic form a setup of apparatus in which the invention may be practiced. This apparatus consists of a reaction chamber 10 through which there is moved, as a moving column, a flowing stream of particle form solid contact mass material. Hydrocarbons to be reacted, supplied to the system through pipe 11 are subjected to the charging stock preparation step indicated at 12, and from 12 flow through pipe 13 into reactor 10. The charging stock preparation step will in general consist in the main of heating the hydrocarbon charging stock to provide it in vapor form and at reaction temperature for entry to the reaction zone. The heating equipment used may be any of the usual forms of apparatus suitable for this purpose and will usually and preferably include a pipe still form of heater. The stock preparation step, it is also understood, may contain, if necessary, provision for separating from the material flowing through pipe 11 any portion which is not suitable for charge to reactor 10. For example, if a crude oil were charged through 11 and it was desired to pass only gas oil through pipe 13, the stock preparation step would include appropriate fractionating equipment, evaporators, vapor heaters, if necessary, and similar equipment capable of segregating from the charge only that desired portion to be converted and bringing it to the proper temperature for reaction while rejecting other portions of the original charge from the system. Reaction products from reactor 10 will be withdrawn through pipe 14 and passed to appropriate equipment for segregating and recovering products of reaction as indicated at 15. This equipment will normally be comprised of the usual setup of fractionators, gas separators, stabilizers, gas recovery systems and the like, as indicated by the necessities of the conversion in hand and will normally include provision for returning unconverted material or even other reaction products to the reactor for retreatment with or without prior passage through a stock preparation step.

It will also be understood that in the stock preparation, or at any other appropriate point, provisions may be made for heat exchange and heat recovery as is usual in the art.

Particle form solid contact mass flowing from reactor 10 and contaminated by the reaction deposit contained therein, is preferably passed through a purge section 16, wherein by means of a purge medium introduced at 17 and removed at 18, it may be freed of reactants. Passing through a valve 19, or any similar device, capable of controlling the rate of passage of solid material, which device also, if desired, may be so designed as to assist in the proper isolation of the reaction zone from other portions of the system, the solid material passes into elevator 20. It is therein hoisted and discharged at 21 into the top of regenerator 22, to pass therethrough as a moving column. The regeneration is usually a combustion and to effect it, regeneration medium may be introduced at 23 and withdrawn at 24. Below regenerator 22, there is another purge section 25, purge medium being supplied at 26 and withdrawn at 27, in which regeneration medium may be removed to substantially prevent its presence in reaction chamber 10. Between this purge chamber 25 and reaction chamber 10, there may be provided a valve or other device 28 for the purpose of controlling solid flow, to assist in the isolation of the reactor, or to permit of carrying a pressure in the reactor different from that in other portions of the system. Similarly, if desired, a valve or other device 29 may be provided for complete control of similar functions within the regenerator. If necessary, catalyst may be withdrawn from the system as, for example, at 30, or may be added, as for example at 31, and it is also to be understood that proper provision, if desirable, may be made for the removal of fines from the catalyst circulation system, for holding the external catalyst circulation system under pressure or vacuum or under a blanketing inert gas, and similar provisions.

The reaction carried out in reactor 10 in Figure 1 and the regeneration carried out in regenerator 22 are alike in that they comprise a contacting of a moving particle form solid with a fluid gasiform reactant. As pointed out before, it is advisable and even necessary that uniform contact of reactant and solid be secured and to this end at the bottom of both the regenerator and the reactor, there have been provided structures as discussed in the following figures.

In Figure 2, there is shown in vertical section one manner in which a uniform movement of particle form solid downwardly through substantially the entire length of such a reaction column may be achieved. In this and subsequent figures, when speaking of reactors, it must be remembered that this term refers equally to reactors such as 10 in Figure 1 and regenerators such as 22 in Figure 1. In Figure 3, 10 is the shell of a reactor containing a downwardly moving column of contact mass material indicated by 32. To uniformly withdraw the solid over the entire area, there are provided a series of orifices 33 from each of which there leads a pipe 34, all of which pipes terminate at level 35 within a single discharge pipe 36 at the bottom of which there is a valve or rate of flow controlling device 37 exercising the functions pointed out for items 19 and 28 in Figure 1. For two features of this construction it is necessary to refer to Figure 3 which shows orifices 33 to be distributed uniformly across the entire cross-sectional area of vessel 10 and to Figure 4 which shows the pipes 34 at the same point and in a symmetrical grouping within pipe 36 at level 35.

Returning to Figure 2, it is noted that above each orifice 33, there is a tapering conical path in which solid is freely moving and between these cones, there are stagnant zones in which solid does not move with rapidity if at all. It also may be noted, however, that due to the number of orifices 33 used, the moving cones intersect at a level very shortly above the bottom of reactor 10 and that above this level of intersection there is uniform flow of solid throughout the cross-sectional area of the vessel. Further, to secure uniform flow of solid through all of the pipes 34, no one of these pipes should have a slope less than enough to give free movement, which for most solid contact mass materials means a slope of not less than about 45°. More important, is that two further conditions must be met, namely, that all pipes 34 should end at the same horizontal level 35 and should be uniformly and compactly spaced together at this point so that resistance is equalized and uniform flow assured for all tubes. Similarly, the tube or pipe 36 between level 35 and control device 37 should be so arranged as to establish a uniform clay flow across its cross-section at level 35. This will usually be assured by providing for pipe 36 a length equal to at least twice its diameter if circular, or twice its diagonal, if rectangular. It may also be done by other means, such as grates, valving, or the like.

It is necessary that the areas of each pipe 34 and of pipe 36 be sufficient to carry any desired amount of contact mass material.

Not only does this method provide equal flow, but it is capable of providing equal flow throughout the whole of the area of reactor 10 regardless of the rate at which solid is removed through control device 37. If 37 be open only sufficiently to provide a very small rate of flow, it is obvious that solid cannot enter orifice 33 at a rate more than that at which it is removed and that the rate will be equal for each orifice. If control 37 be wide open, we still have the same conditions of equality of flow and equal downward movement in all areas of reactor 10.

Turning now to Figure 5, we find a provision that can be made with effectiveness in the case of extremely large diameter vessels. In such vessels, a more extensive sub-division of solid material flow must be made to assure uniformity over the entire area of reactor 10. Of course, the number of pipes 34 could be multiplied, but it is more effective, more convenient and less costly to effect this further subdivision by means of an auxiliary baffle indicated at 39. This baffle will be so punched, drilled or cut as to provide for each orifice 33 a plurality of orifices 40.

Turning to Figure 6, which is a horizontal section taken in Figure 5 at the level indicated, we find ourselves looking down on baffle 39. This baffle contains a number of orifices 40, arranged preferably in symmetry with orifices 33 in the bottom of the reactor.

Turning back to Figure 5, the vertical spacing of baffle 39 above the level of orifices 33 as indicated by dimension 41 should be sufficient to provide not less than about a 45° angle of flow with the horizontal between any port 40 and any port 33.

In this construction the numerous small streams flowing through ports 40, which ports are uniformly distributed over the entire area within reactor 10, combine into a lesser number of larger streams flowing through orifices 33, which in turn, are combined as before into a single stream in pipe 36.

Figures 7 and 8 are similar, respectively, to Figures 5 and 6, the only difference being that Figures 7 and 8 show a rectangular shelled reactor, while Figures 5 and 6 show a reactor of circular cross-section.

It will be understood that this operation depends upon the application of the principle of establishing a downwardly flowing column of particle-form solid contact mass material, of removing solid from said column in a plurality of substantially equal streams from each of a plurality of points distributed uniformly across the cross-sectional area of the column, later re-combining those streams to form a single discharge stream and controlling the amount of solid leaving the system through this discharge stream.

Illustrative of another way in which this principle may be applied, is Figure 9 which together with related Figures 10 and 11 shows the application of the principle to the bottom of a reactor feeding into the boot of an elevator, quite similar to the showing in Figure 1. In Figure 9, we have again reactor shell 10 from which depend pipes 34 (only a few being shown for clarity). 42 is the boot or a chute leading to the boot of an elevator or any other chute for laterally moving the flowing solid out from under reactor 10. This chute 42 is provided with partitions 43 as may be more clearly seen in Figures 10 and 11 forming spaces into which the various pipes 34 discharge, and establishing an area of equal resistance and thereby automatically equalizing the flow in the several pipes 34.

I claim:

1. A method of effecting conversion of hydrocarbons in the presence of particle-form solid contact mass material comprising flowing said particle-form solid contact mass material downwardly through a reaction zone as a moving column under reaction conditions of temperature and pressure, replenishing the solid material in said column, introducing heated substantially vaporous hydrocarbons into said column, removing reaction products from said column, removing the particle form solid from the reaction zone by subdividing the column into a plurality of substantially equal components distributed uniformly across the cross-sectional area of the reaction zone in substantially a single plane, the cumulative cross-section area of said components being less than the cross-sectional area of the reaction zone column, causing said components to converge at angles with the vertical less than about 45 degrees, combining said components into a single flowing discharge column of less cross-sectional area than the reaction zone column and controlling the rate of flow in said discharge column uniformly throughout its cross-section and such as to maintain continuity of solid material column from said flowing discharge column through each of said components to said reaction zone column.

2. A method for effecting a conversion of a fluid reactant in the presence of a particle-form solid contact mass material comprising flowing said particle-form solid contact mass material downwardly through a reaction zone as a moving column under reaction conditions of temperature and pressure, replenishing the solid material in said column, introducing fluid reactant at conditions appropriate for reaction into said column, removing products of reaction from said column, removing the particle form solid from the reaction zone by subdividing the column into a plurality of substantially equal components distributed uniformly across the cross-sectional area of the reaction zone in substantially a single plane, the cumulative cross-sectional area of said components being less than the cross-sectional area of the reaction zone column, causing said components to converge at slopes with the horizontal greater than about 45 degrees, recombining said components into a single flowing discharge column of less cross-sectional area than the reaction zone column and controlling the rate of flow in said discharge column uniformly throughout the zone of recombination and such as to maintain continuity of solid material column from said flowing discharge column through each of said components to said reaction zone column.

3. A method of effecting conversion of hydrocarbons in the presence of particle-form solid contact mass material comprising flowing said particle-form solid contact mass material downwardly through a reaction zone as a moving column under reaction conditions of temperature and pressure, replenishing the solid material in said column, introducing heated substantially vaporous hydrocarbons into said column, removing reaction products from said column, effecting substantially uniform downward movement of all portions of said column by removing the particle-form solid therefrom in a plurality of streams from each of a plurality of points equally distributed across the cross-sectional area of said reaction zone, each stream being created by combining parts of several smaller streams withdrawn from points above and symmetrically located with respect to said first named points, recombining those first mentioned streams to form a single discharge stream and controlling the amount of such discharge.

4. A method of regenerating particle-form solid contact mass material comprising flowing said particle-form contact mass material downwardly through a reaction zone as a continuous moving column under regenerating conditions of temperature and pressure, replenishing the solid material in said column, introducing a regenerating medium into said column, removing products of regeneration therefrom, removing the particle form solid from the reaction zone by subdividing the column into a plurality of substantially equal components distributed uniformly across the cross-sectional area of the reaction zone in substantially a single plane, the cumulative cross-sectional area of said components being less than the cross-sectional area of the reaction zone column, causing said components to converge at slopes with the vertical of less than about 45 degrees, combining said components into a single flowing discharge column of substantially less cross-sectional area than said column in said reaction zone and controlling the rate of flow of said discharge column at an elevation below the zone of said combination of components in such a manner as to maintain uniform flow of said solid material across the entire cross-section of said discharge column at said zone of combination and as to maintain continuity of solid material column from said flowing discharge column through each of said components to said column within said reaction zone.

5. A method for effecting a conversion of a fluid reactant in the presence of a particle-form solid contact mass material comprising flowing said particle-form solid contact mass material downwardly through a reaction zone as a moving column under reaction conditions of temperature and pressure, replenishing the solid material in said column, introducing fluid reactant at conditions appropriate for reaction into said column, removing products of reaction from said column, removing the particle-form solid material therefrom by sub-dividing said column into a plurality of substantially equal streams originating at a plurality of points distributed uniformly across the cross-sectional area of said column in substantially a single plane, the cumulative cross-section of said streams being less than that of said reaction zone column, causing said streams to converge at an angle with the vertical of less than about 45 degrees, merging said streams at a common level into a common stream flowing in a confined path of substantially less cross-section than the reaction zone column and controlling the rate of flow of said common stream such as to maintain continuity of column from said common stream through each of said plurality of streams to said reaction zone column, said control of the rate of flow being effected by throttling of solid flow at a level sufficiently below the level of merger of said streams that the flow rate of said common stream at said level of merger is substantially uniform throughout its cross-sectional area.

6. A method for effecting a conversion of a fluid reactant in the presence of a particle-form solid contact mass material comprising, flowing said particle-form solid contact mass material downwardly through a reaction zone as a moving column under reaction conditions of temperature and pressure, replenishing the solid material in said column, introducing fluid reactant at conditions appropriate for reaction into said column, removing products of reaction from said column, removing the particle-form solid materials therefrom in a plurality of substantially equal confined streams from each of a plurality of points distributed uniformly across the cross-sectional area of said column in substantially a single plane, converging said confined streams at an angle with the vertical less than about 45 degrees, merging said confined streams at a common level into a continuing composite confined discharge stream of less cross-sectional area than said reaction zone column, and throttling the flow of said discharge stream at a distance below the common level of merger at least twice the diameter of said discharge stream, said throttling being at least sufficient to maintain continuity of solid material column from said discharge stream through each of said plurality of confined streams to said reaction zone column.

7. The method of conducting a reaction involving flowing a moving bed of particle-form solid contact mass material from a reaction zone of relatively great cross-sectional area to a discharge zone of lesser cross-sectional area while introducing reactants into said reaction zone, withdrawing products of reaction from said reaction zone and replenishing the material therein which comprises, passing the material through a narrowing zone intermediate the reaction zone and the discharge zone, interposing resistances to flow in said intermediate zone proportioned to subdivide said moving bed in said intermediate zone uniformly across the horizontal cross-sectional area of said zone, without disrupting the continuity of the bed in said intermediate zone, said subdivisions having an accumulative cross-section substantially less than that of the reaction zone, proportionately merging said subdivisions to form a common moving bed of solid material within said discharge zone while limiting the angle of convergence of said subdivisions below about 45 degrees with the vertical, and controlling the rate of flow of said bed in said discharge zone such as to provide substantially uniform solid flow across its cross-section at its upper end and such as to maintain continuity of bed from said discharge zone through said subdivisions in said intermediate zone to said bed in said reaction zone whereby uniformity of solid flow across substantially the entire reaction zone cross-section is attained.

8. Apparatus for effecting the conversion of a fluid reactant in the presence of a particle-form solid contact mass material flowing as a moving bed which comprises, a reaction chamber, a discharge conduit of lesser cross-sectional area than said reaction chamber, means for introducing reactants into said reaction chamber, means for withdrawing products of reaction from said reaction chamber, means for supplying mass material to said reaction chamber, means connecting said reaction chamber to said discharge conduit, means in said connecting means for subdividing the moving bed of contact mass material into components and for causing said components to proportionately converge at angles with the vertical less than about 45 degrees to provide a common stream in said discharge conduit, and means in said discharge conduit for controlling the flow rate therein at the ingress end uniformly throughout its cross-sectional area and such as to maintain continuity of solid column from said discharge conduit through each of said components to said reaction chamber.

9. Apparatus for contacting flowing solid particle-form contact mass material with a fluid gasi-form reactant which comprises, means defining a columnar reaction chamber, means for introducing fluid reactant into said chamber, means for removing the products of reaction from said chamber, means for introducing solid particle-form contact mass material into the top of said chamber, a plate defining the bottom of said chamber, a plurality of uniformly distributed apertures of equal cross-section in said plate, means defining a discharge chamber below the reaction chamber and of lesser cross-sectional area, a conduit extending from each aperture in said plate at a slope greater than about 45 degrees to a common level within said discharge chamber, said discharge chamber being of substantially constant cross-sectional area along its length, and means associated with said discharge chamber for controlling the solid flow rate therein at the ingress end uniformly throughout its cross-sectional area and such as to maintain continuity of solid column from said discharge chamber through each of said conduits to said reaction chamber.

10. The apparatus of claim 9 further comprising, a baffle located within the reaction chamber in a plane above and parallel to said plate, said baffle having a plurality of uniformly distributed orifices therein arranged in staggered relation relative to the pattern of distribution of the apertures in the plate, said orifices being of lesser cross-sectional area than said apertures.

11. The apparatus of claim 9 further comprising, a baffle located within the reaction chamber in a plane above and parallel to said plate, said baffle having a plurality of uniformly distributed orifices therein arranged in staggered relation according to the pattern of distribution of the apertures in the plate, the orifices in said baffle being greater in number than the apertures in said plate.

12. The apparatus of claim 9 further comprising, a baffle located within the reaction chamber in a plane above and parallel to said plate, said baffle having a plurality of uniformly distributed orifices therein arranged in staggered relation relative to the pattern of distribution of the apertures in said plate, said orifices being greater in number and of lesser cross-sectional area than said apertures.

13. Apparatus for contacting flowing particle form solid contact mass material with a gasiform reactant which comprises, means defining a columnar reaction chamber, means for introducing fluid reactant into said chamber, means for removing the products of reaction from said chamber, means for introducing solid particle form contact mass material into the top of said chamber, a member defining the bottom of said reaction chamber, said bottom member having therethrough a plurality of uniformly distributed apertures of substantially equal cross-section, a discharge conduit below said reaction chamber of substantially less cross-section than said reaction chamber, a tube extending from each of said apertures in said bottom member at a slope greater than about 45 degrees to a common level within said discharge conduit, flow throttling means on said discharge conduit at a distance below said common level at least twice the diameter of said discharge conduit, said throttling means being adjustable, said discharge conduit being of substantially constant cross-sectional area throughout its length above said flow-throttling means.

14. A method for effecting the conversion of a fluid reactant in the presence of a particle-form solid contact mass material flowing as a moving bed through a reaction zone to a discharge zone of lesser cross-sectional area which comprises, introducing reactants into said reaction zone, withdrawing products of reaction from said reaction zone, adding mass material to said zone, flowing the material from the bottom of said reaction zone as a subdivided moving bed uniformly distributed over the cross-sectional area of the bottom of said reaction zone, said subdivided moving bed having a cumulative cross-section less than that of the reaction zone, causing said subdivisions to converge at an angle with the vertical less than about 45 degrees, proportionately merging said subdivisions into a continuous moving bed constituting a discharge zone of less cross-sectional area at and below the level of final merger than said reaction zone and throttling the flow of solid from said discharge zone at a distance below said level of merger equal to at least twice the diameter of said discharge zone to control the rate of solid discharge and to maintain continuity of solid column between said level of throttling and the level of solid inlet to said discharge zone, whereby substantially uniform solid flow is attained across the entire cross-section of said reaction zone.

15. A method for effecting uniform contacting between a gaseous material and a particle form solid material flowing through a confined contacting zone to a confined discharge zone of less cross-sectional area than said contacting zone and of substantially constant cross-sectional area along its length which comprises introducing contacting gas into said contacting zone to contact said particle-form solid and withdrawing contacted gas from said contacting zone, adding particle-form solid material to the upper section of said contacting zone, flowing the solid material from the bottom of said contacting zone as a subdivided moving bed uniformly distributed over the cross-sectional area of the bottom of said contacting zone, said subdivided moving bed having a cumulative cross-sectional area less than that of said contacting zone, converging said subdivisions at an angle with the vertical less than about 45 degrees, and without subsequent splitting of said subdivisions, proportionately merging said subdivisions at a common level within said discharge zone to form a continuous moving substantially compact single stream of substantially constant cross-sectional area along its length, and of less cross-sectional area than said contacting zone and throttling the flow of solid from said discharge zone at a distance below said common level equal to at least twice the diameter of said discharge zone to control the rate of solid discharge and to maintain continuity of solid column between said level of throttling and said common level within said discharge zone, whereby substantially uniform solid flow is attained across the entire cross-sectional area of said contacting zone.

16. The method of conducting a reaction involving flowing a moving bed of particle-form solid contact mass material from a reaction zone of relatively great cross-sectional area to a discharge zone of lesser cross-sectional area while introducing reactants into said reaction zone, withdrawing products of reaction from said reaction zone and replenishing the material therein which comprises, passing the material through a narrowing zone intermediate the reaction zone and the discharge zone, interposing resistances to flow in said intermediate zone proportioned to subdivide said moving bed in said narrowing zone uniformly across the horizontal cross-sectional area of said zone, without disrupting the continuity of the bed in said narrowing zone, said subdivisions having an accumulative cross-sectional area substantially less than that of the reaction zone, proportionately merging said subdivisions to form within said discharge zone a common substantially compact downwardly extending stream, substantially uniform in cross section along its length while limiting the angle of convergence of said subdivisions below about 45 degrees with the vertical and throttling the flow of solid in said stream at a distance below its upper end equal to at least twice the diameter of said stream so as to provide substantially uniform solid flow across its cross section at its upper end and such as to maintain continuity of solid column from said stream through said narrowing zone to said bed in said reaction zone.

17. Apparatus for effecting contact of gas with a particle form contact material flowing as a moving bed which comprises: a gas-solid contacting chamber, a discharge conduit of substantially less cross-sectional area than said contacting chamber, means for introducing contact gas into said chamber and means for withdrawing contacted gas from said chamber, means for supplying contact material to said chamber, means connecting said chamber to said discharge conduit, subdividing the moving bed of contact material into components and causing said components to proportionately converge at angles with the vertical less than about 45 degrees to provide a common stream in said discharge conduit and means in said discharge conduit for controlling the flow rate therein at the ingress end uniform throughout its cross-sectional area, and such as to maintain continuity of solid column from said discharge conduit through each of said components to said contacting chamber.

LOUIS P. EVANS.